United States Patent [19]

Cottrell et al.

[11] 4,316,686
[45] Feb. 23, 1982

[54] AUTOMOBILE TIE DOWN ASSEMBLY FOR VEHICLE CARRIERS

[76] Inventors: Don J. Cottrell, 2164 Hawthorne La.; Don M. Cottrell, Rte. 7, Duckett Mill Rd., both of Gainesville, Ga. 30501

[21] Appl. No.: 73,515

[22] Filed: Sep. 7, 1979

Related U.S. Application Data

[63] Continuation-in-part of Ser. No. 920,189, Jun. 29, 1978, Pat. No. 4,227,734.

[51] Int. Cl.³ .................. B60P 7/08; B61D 17/00; B61D 45/00
[52] U.S. Cl. ................................. 410/12; 410/23; 410/103
[58] Field of Search .............. 254/343; 410/7, 8, 9, 410/10, 11, 12, 23, 100, 103

[56] References Cited

U.S. PATENT DOCUMENTS

| | | | |
|---|---|---|---|
| 30,607 | 11/1860 | Patten | 254/343 |
| 1,806,482 | 5/1931 | Mellon | 254/343 |
| 1,990,163 | 2/1935 | Blackburn et al. | 254/343 |
| 2,382,054 | 8/1945 | Hercik | 254/343 X |
| 3,465,691 | 9/1969 | Simmons | 410/12 |
| 3,853,347 | 12/1974 | Harold | 410/11 |
| 3,860,263 | 1/1975 | Taylor | 410/12 |
| 4,022,134 | 5/1977 | Krokos | 410/23 |
| 4,227,734 | 10/1980 | Cottrell et al. | 410/12 |

FOREIGN PATENT DOCUMENTS 163418  10/1905  Fed. Rep. of Germany ...... 410/100

Primary Examiner—Joseph F. Peters, Jr.
Assistant Examiner—Howard Beltran
Attorney, Agent, or Firm—B. J. Powell

[57] ABSTRACT

An automobile tie down assembly for use on vehicle supporting track assemblies in vehicle carriers to secure the vehicle being carried on the track assemblies including a guide assembly to guide the flexible tie down member attached to the vehicle and a tie down mechanism for winding the flexible tie down member thereon to tie down the vehicle where the tie down mechanism includes a tie down winding shaft onto which the flexible tie down member is wound, an input drive member adapted to be engaged and rotated, and gearing means interconnecting the tie down winding shaft and the input drive member so that rotation of said input member rotates the tie down winding shaft, the gearing means constructed and arranged so that said gearing means is substantially irreversible whereby the input shaft can be rotated to drive the tie down winding shaft while rotation of the tie down winding shaft to drive the input shaft is substantially precluded.

6 Claims, 10 Drawing Figures

AUTOMOBILE TIE DOWN ASSEMBLY FOR VEHICLE CARRIERS

CROSS-REFERENCE TO RELATED APPLICATION

This application is a continuation-in-part of my co-pending application Ser. No. 920,189, filed June 29, 1978, now U.S. Pat. No. 4,227,734.

BACKGROUND OF THE INVENTION

Passenger vehicles are generally transported from the manufacturer to the dealer on tractor-trailer trucks commonly referred to in the industry as car haul carriers. These car haul carriers usually have a number of vehicle supporting track assemblies which can be adjustably positioned in the carrier to support different vehicle loads. The vehicles to be transported are supported on top of the supporting track assemblies for transport. To keep the vehicles on the track assemblies, they must be tied down. This tying down of the vehicles is accomplished with a plurality of tie down mechanisms to which a flexible tie down member such as a chain or cable is attached so that the tie down member can be hooked onto the vehicle and then the tie down member wound onto the tie down mechanism to take up the slack in it and force the vehicle down onto the top of the supporting track section to keep it in position.

Prior art tie down mechanisms generally included a tie down shaft rotatably mounted on the supporting track section to which one end of the flexible tie down member is attached so that it can be wound around the tie down shaft to take up the slack in the flexible tie down member and force the vehicle down onto the top of the supporting track assembly. One end of the tie down shaft has a driving head on it with holes so that the operator can insert a tie down bar in these holes and use it to rotate the driving head and tie down shaft. To keep the tie down shaft in position while tying down a vehicle, the driving head usually had ratchet teeth on it engaged by a ratchet pawl. The ratchet pawl was manually released when the vehicles were being untied for unloading.

These prior art tie down mechanisms have had a number of problems associated with them. One of these problems is that they required the operator to exert considerable effort to tighten the flexible tie down member sufficiently to properly tie down a vehicle. This was so even though the tie down bar was about three feet long. As a result, operators have frequently been injured due to overexertion in trying to properly tie down a vehicle. Another problem has been associated with the untying of the vehicle. To untie a vehicle, it was necessary for the operator to rotate the driving head sufficiently with the tie down bar to release the pressure on the ratchet pawl so that it could be released and then manually disengage the ratchet pawl while holding the tie down bar against the full tie down force load on the tie down shaft. The operator sometimes let the bar slip out of his grasp or could not maintain his control over the tie down bar so that the tie down bar was rapidly moved by the load. This frequently resulted in injury to the operator and/or damage to the vehicle.

SUMMARY OF THE INVENTION

These and other problems and disadvantages associated with the prior art are overcome by the invention disclosed herein by providing a tie down mechanism which can safely be used to tie down vehicles on the supporting track assemblies of a car haul carrier without the danger of the operator overexerting himself and without the danger of the member operated by the operator in releasing the vehicle striking the operator or the vehicle so as to injure the operator or damage the vehicle. The invention is constructed so that it is substantially irreversible in order that the input member to the invention can be easily manipulated by the operator to tie down or release the vehicle, yet the reactive forces exerted on the invention by a tied down vehicle are not appreciably transmitted back to the input member so as to create a danger to the operator. The mechanical advantage of the invention is sufficient to allow the operator to generate the necessary output forces necessary to tie down a vehicle while the level of the input forces required by the operator are kept sufficiently low to prevent overexertion by the operator.

The apparatus of the invention includes a tie down mechanism with a tie down winding shaft that mounts a flexible tie down member so that the flexible tie down member can be attached to the vehicle to be tied down and the flexible tie down member wound onto the tie down winding shaft as it is rotated to force the vehicle down onto the support track assembly to tie it down. A drive mechanism is provided for selectively rotating the tie down winding shaft and includes an input drive member adapted to be engaged and rotated by the operator together with gearing means connecting the input drive member and the tie down winding shaft so that rotation of the input drive member causes rotation of the tie down winding member. Preferably, the gearing means is substantially irreversible so that rotation of the input drive member by the tie down winding shaft is substantially prevented.

The apparatus of the invention may also include releasable locking means independent of the gearing means to prevent rotation of the input drive member by the tie down winding shaft while under load. Further, a guide assembly may be provided which permits the angle of the tie down forces exerted on the vehicle to be selectively changed.

These and other features and advantages of the invention will become more apparent upon consideration of the following detailed description and accompanying drawings wherein like characters of reference designate corresponding parts through the several views and in which:

These figures and the following detailed description disclose specific embodiments of the invention; however, it is understood that the inventive concept is not limited thereto since it may be incorporated in other forms.

DETAILED DESCRIPTION OF ILLUSTRATIVE EMBODIMENTS

Figure 1:
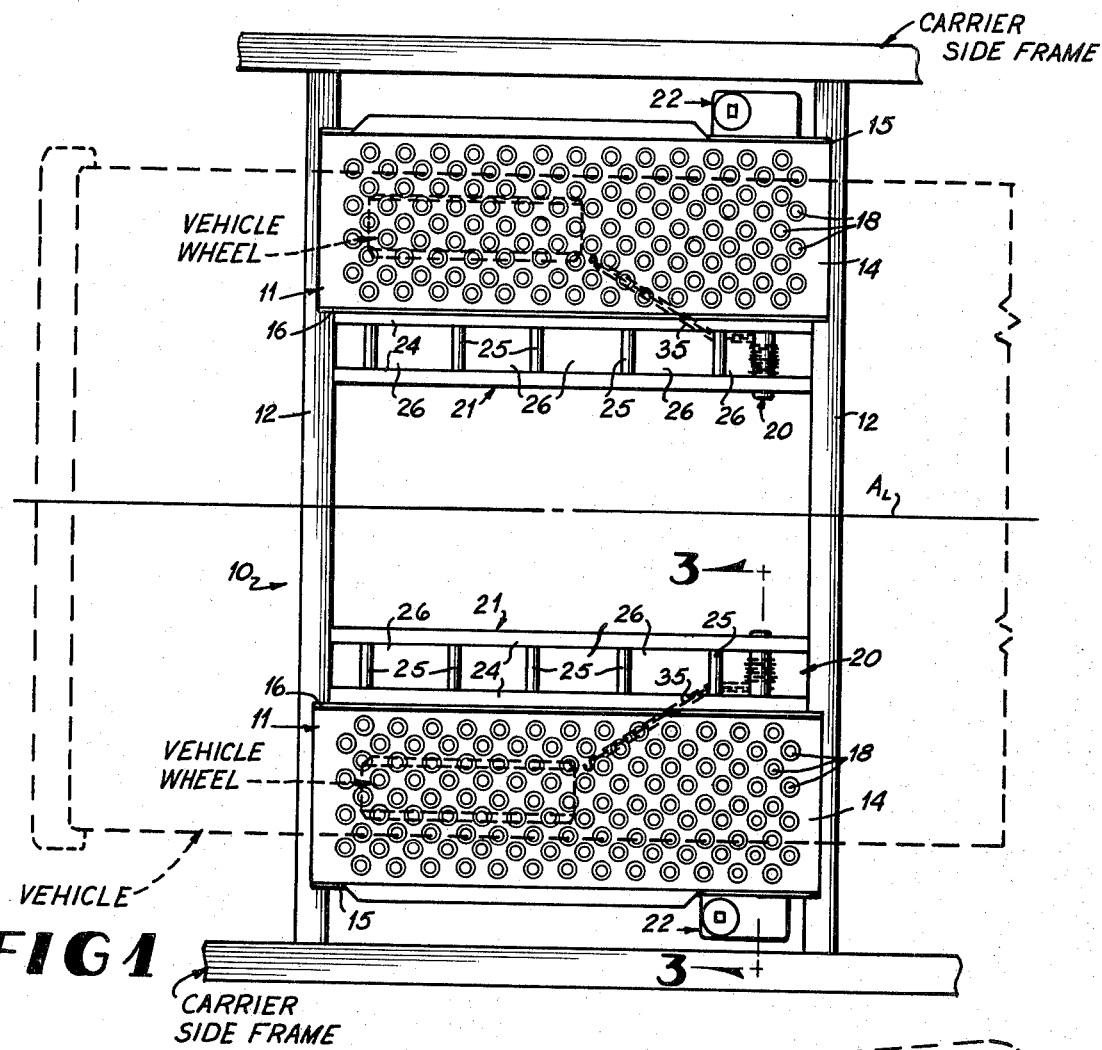
FIG. 1 is a top plan view of a short supporting track assembly in a car haul trailer incorporating the invention therein.
Figure 2:
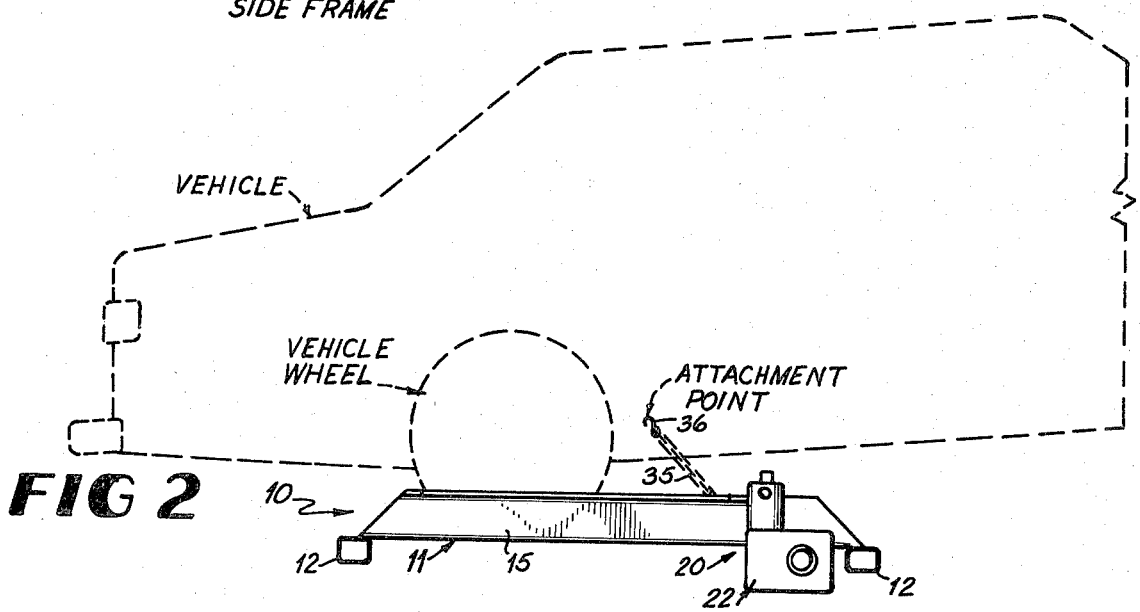
FIG. 2 is a side view of the track assembly of FIG. 1.

The invention is designed for use with the supporting track assemblies in a car haul carrier such as that disclosed in our co-pending application Ser. No. 920,189 to tie down the vehicles onto these supporting track assemblies. FIGS. 1 and 2 illustrate the invention applied to a supporting track assembly 10 of a type typically used in a car haul carrier. The track assembly 10 is for illustration purposes only and is not meant to be limiting inasmuch as the invention can be applied to any of the track assemblies normally found on the car haul carrier.

The track assembly 10 is a short assembly which supports one end of the vehicle with the other end of the vehicle supported on another track assembly. It is understood that track assembly 10 may be of different lengths as is typical of car haul trailers. The track assembly 10 includes a pair of spaced apart tire support tracks 11 which extend parallel to the longitudinal axis $A_L$ of the assembly 10 and are supported on cross supports 12. The tracks 11 are spaced so as to be in registration with the vehicle tires as it is driven onto the track assembly 10 along axis $A_L$. A typical vehicle is partly shown by dashed lines in FIGS. 1 and 2 for reference.

Each of the tracks 11 is provided with a central tire support section 14, an outboard flange 15 integral with the outside edge of section 14 and extending along the length thereof and an inboard lip 16 integral with the inside edge of the central section 14 and extending along the length thereof. The outboard flange 15 and inboard lip 16 serve to provide longitudinal support to the tire support section 14 to support the vehicle thereon. The tire support section 14 may further be provided with dimpled holes 18 to help keep the central section 14 flat and provide traction for the vehicle tires.

Tie down assemblies 20 serve to tie down the vehicle on the track assembly 10 with a tie down assembly 20 being associated with each track 11. Each tie down assembly 20 includes a guide assembly 21 and one or more tie down mechanisms 22, one mechanism 22 being shown in each tie down assembly 20.

The guide assembly 20 includes a pair of spaced apart side tubes 24 with transversely extending guide tubes 25 attached therebetween at spaced apart positions along the length of the side tubes 24. The guide assembly 20 is attached to the inboard lip 16 of track 11 and extends along the length of the track 11 with the side tubes 24 parallel to the axis $A_L$. The side tubes 24 and guide tubes 25 thus define a series of spaced apart spaces 26 through the guide assembly 21 as will become more apparent.

Figure 3:
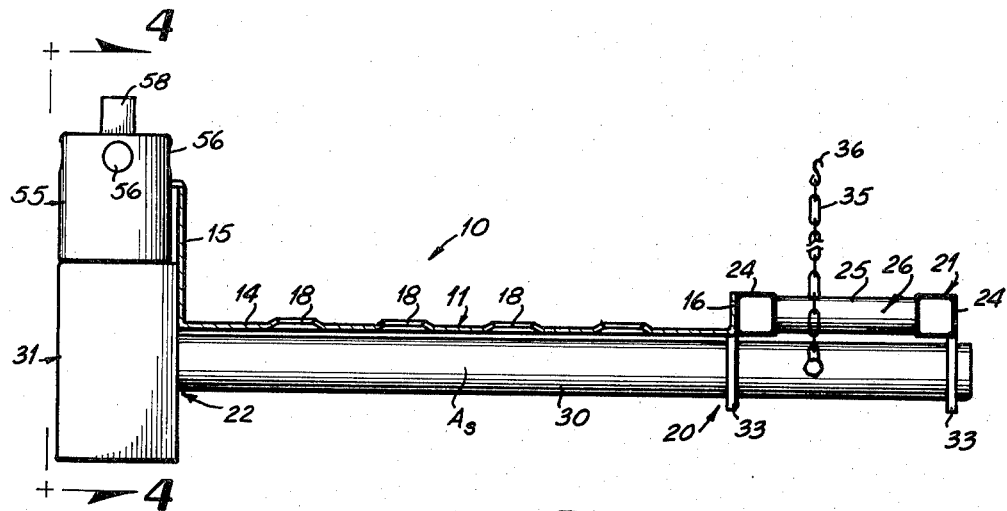
FIG. 3 is an enlarged cross-sectional view taken along line 3—3 in FIG. 1.

Each of the tie down mechanisms 22 as best seen in FIGS. 3-6 is mounted on track 11 in operative association with the guide assembly 21. The tie down mechanism 22 includes a tie down winding shaft 30 and shaft driving mechanism 31. The winding shaft 30 is located below the central tire support section 14 of track 11 so that its axis $A_S$ is generally horizontal and normal to the track assembly axis $A_L$. The shaft driving mechanism 31 is attached to the outboard side flange 15 with the winding shaft 30 extending therefrom under the central section 14 on track 11 to the guide assembly 21. The inboard end of winding shaft 30 is rotatably journalled in supports 31 at guide assembly 21 as best seen in FIG. 3. The inboard end of the winding shaft 30 is illustrated located below the guide assembly 21; however, it will be appreciated that the shaft 30 may likewise be located above, in the same plane, in front of or in back of the guide assembly 21 and still operate as hereinafter described.

A flexible tie down member 35 illustrated as a chain in FIG. 3 is attached to the inboard end of the winding shaft 30 in registration with the guide assembly 21 by an appropriate connector so that as shaft 30 is rotated, the tie down member 35 will be wound onto the winding shaft 30. The opposite end of the flexible tie down member 35 is provided with an appropriate hook 36 for connection to an attachment point on the vehicle as seen in FIG. 2. Thus, when the hook 36 is attached to the vehicle and the flexible member 35 wound around shaft 30, the vehicle will be tied down onto the track assembly 10 with the vehicle suspension partly compressed. Before the hook 36 is attached to the vehicle, the flexible tie down member is passed through a selected one of the spaces 26 in the guide assembly 21 so that the guide tubes 25 direct the tie down forces applied to the vehicle by the tie down member. This allows the angles of the different tie down forces applied to the vehicle by the various tie down mechanisms to be properly arranged in opposition to each other as required by good tie down practice.

The shaft driving mechanism 31 includes a closed housing 40 defining a gear chamber 41 therein. The outboard end of the winding shaft 30 extends through and is journalled in both the inboard and outboard side walls 42 of housing 40 by bearings 43. Abuttments 44 are provided on the shaft 30 inside chamber 41 and in bearing contact with the bearings 43 to keep the shaft 30 in place axially. The shaft 30 fixedly mounts a worn gear 45 thereon so that rotation of worn gear 45 rotates the winding shaft 30 about its axis.

The housing 40 also mounts an input drive shaft 46 between opposed side walls 48 in bearings 49 so that the drive shaft axis $A_D$ is oriented normal to and spaced from the winding shaft axis $A_S$. Abuttments 50 on input drive shaft 46 inside housing 40 in bearing contact with bearings 49 keep the input drive shaft 46 longitudinally in place and absorb any thrust exerted on shaft 46. Shaft 46 fixedly mounts a worm 51 thereon between abuttments 50 so that the worm teeth 52 are in mesh with the gear teeth 54 on worm gear 45. Rotation of worm 51 rotates worm gear 45 and thus winding shaft 30. Preferably, the lead angles of the worm 51 and worm gear 45 should be selected so that the gearing arrangement is substantially irreversible. That is, the input drive shaft 46 can be rotated to drive the winding shaft 30 while it is very difficult to rotate the winding shaft 30 to drive the input shaft 46. Further, the mechanical advantage of the gearing arrangement should be such that the operator can easily operate the tie down mechanism 22 without any danger of overexertion. On the other hand, the mechanical advantage should not be so high that the time required to operate the tie down mechanism 22 sufficiently to tie down a vehicle is excessive. While different mechanical advantages may be used, a mechanical advantage of about 8-10 has been found satisfactory as a good compromise. The chamber 41 is filled with an appropriate lubricant to lubricate the various gearings and bearings.

Figure 4:
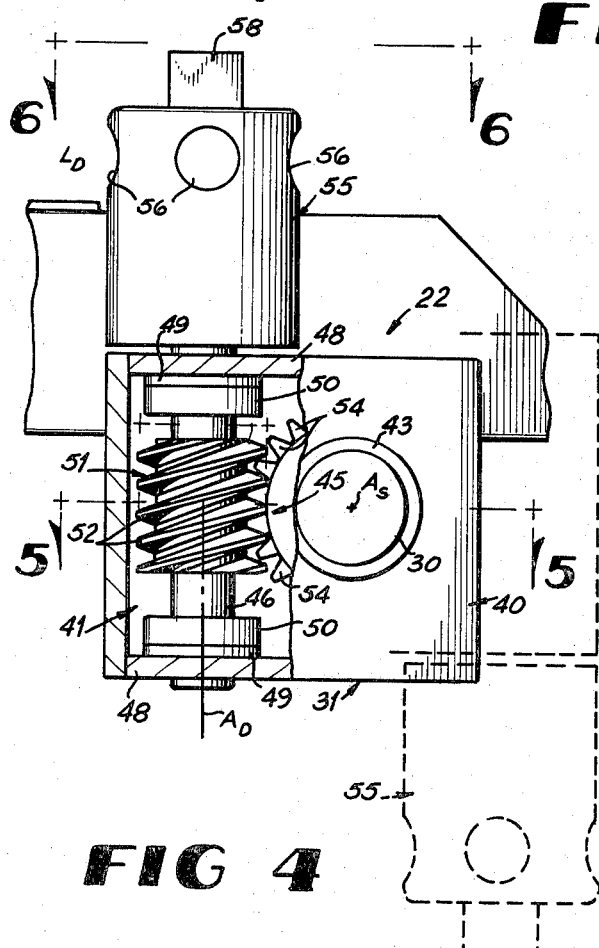
FIG. 4 is an enlarged view taken generally along line 4—4 in FIG. 3 with a portion of the drive mechanism housing broken away to show the internal construction thereof.
Figure 5:
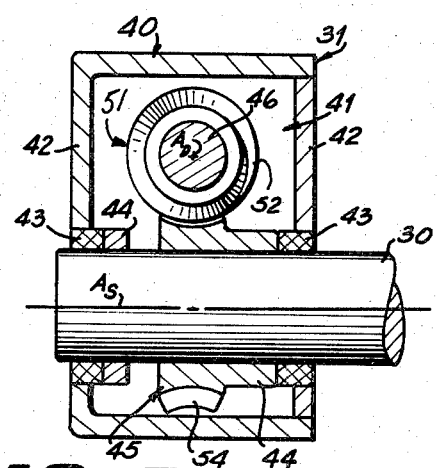
FIG. 5 is a cross-sectional view taken generally along line 5—5 in FIG. 4.
Figure 6:
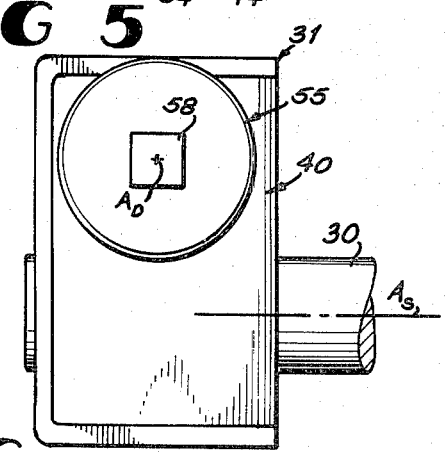
FIG. 6 is an enlarged view taken generally along line 6—6 in FIG. 4.

The input drive shaft 46 has a projecting end extending out of the side wall 8 as best seen in FIG. 4 on which is fixedly mounted an input drive member 55 to be engaged to operate the tie down mechanism. The drive member 55 is provided with a plurality of diametrically extending holes 56 oriented normal to the input drive shaft axis $A_D$ so that a tie down bar (not shown) can be inserted therein to rotate member 55. A driving head 58 is also provided on the driving member 55 axially oriented along shaft axis $A_D$ to be drivingly engaged by a wrench such as a ratchet wrench or an air wrench to operate the tie down mechanism. The drive member 55 has a length $L_D$ seen in FIG. 4. The length $L_D$ is sufficiently long for the operator to gain access to both the bar holes 56 and driving head 58 without interference with the track 11 as will become more apparent.

It will be noted that the driving member 55 is oriented about an axis of rotation normal to the winding shaft 30. Also, it will be appreciated that the shaft driving mechanism 31 will be located close to the carrier side frame as seen in FIG. 2. To compensate for this close clearance, the driving mechanism housing 40 can be rotated about the winding shaft axis $A_S$ until the driving member 55 is located for easiest access. For instance, the track assembly 10 in FIGS. 1 and 2 is usually located in the lower portions of the carrier side frame. The housing 40 is rotated until the driving member 55 projects upwardly toward the top of the track 11. The length $L_D$ of the driving member 55 is selected so that the bar holes 56 and driving head 58 are located above the side flange 15 and central support section 14 of track 11. This permits the operator easy access to the driving member 55 to operate the tie down mechanism 22 while standing outside of the carrier side frame. Likewise, the housing 40 may be rotated so that the driving member 55 projects forwardly or rearwardly along the side flange 15 with the axis $A_D$ generally parallel to the track assembly axis $A_L$. When the track assembly is located in the upper levels of the car haul carrier, the housing 40 may be located so that the driving member 55 projects below the side flange 15 on the track 11 as shown by dashed lines in FIG. 4 to permit easy access thereto by the operator. When the housing 40 has been rotated to the desired position, it can be attached to the side flange 15 on track 11 most easily by welding.

FIRST MODIFICATION

Figure 7:
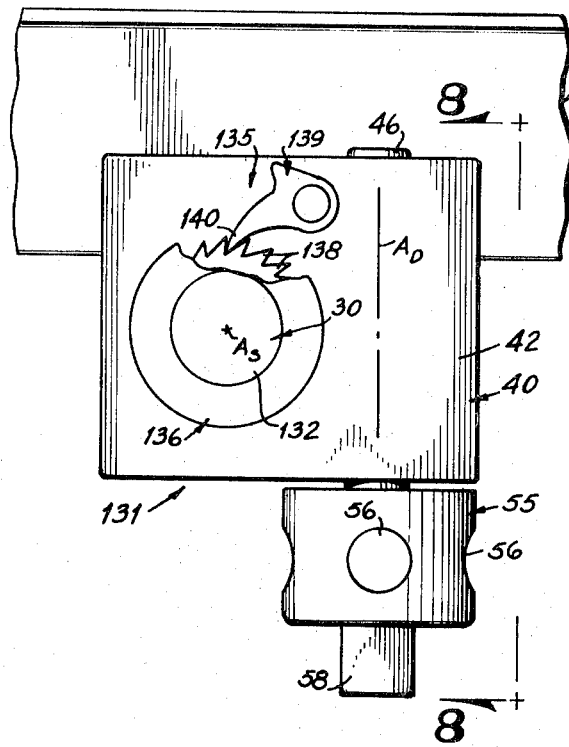
FIG. 7 is a view similar to FIG. 4 showing a modification of the invention.
Figure 8:
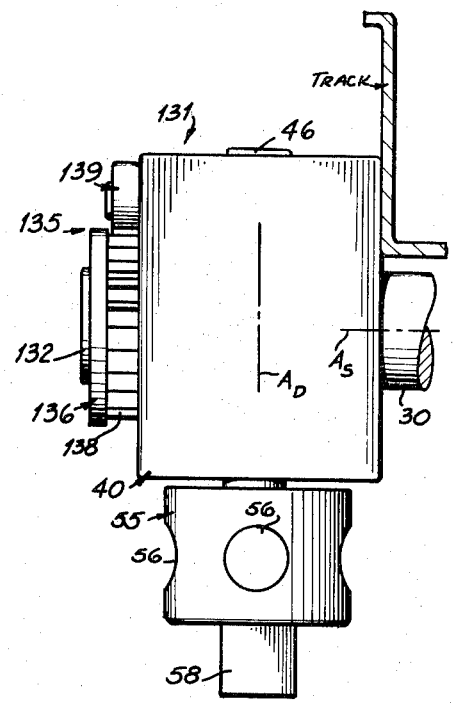
FIG. 8 is a view taken along line 8—8 in FIG. 7.

Referring to FIGS. 7 and 8, a modification of the shaft driving mechanism is shown and has been designated generally by the numeral 131 with the components common to the mechanism 31 having like reference numbers applied thereto. The outboard end of the winding shaft 30 has a projection 132 thereon, extending outside of housing 40. A locking mechanism 135 is operatively associated with the projection 132. The locking mechanism 135 serves two purposes, first to selectively lock the position of the winding shaft 30 under load and the second to provide an indication of the amount the vehicle has been tied down.

Because the degree of irreversibility of the worm 51 and worm gear 45 is dependent on the static angle of friction therebetween which may be reduced by external vibration as the car haul carrier is driven over the highway, the locking mechanism 135 prevents inadvertent loosening of the tie down load on the vehicle if the static angle of friction is lowered sufficiently for the worm/worm gear to become reversible. Also, the locking mechanism 135 helps absorb any shock loads imposed on the winding shaft 30 as the vehicles bounce during transport to prevent damage to the worm gear teeth 54.

It is also necessary that the amount the vehicle is tied down be properly adjusted. If the amount of tie down is too low, the vehicle can undesirably shift on the track assembly. On the other hand, if the amount of tie down is too great, the vehicle suspension or frame can be damaged. The locking mechanism 135 provides an indication as to the amount of rotation of the winding shaft 30 which is an indication of the amount of tie down as will become more apparent.

The locking mechanism 135 is illustrated as a ratchet head 136 affixed to the projection 132 on shaft 30 and rotatable therewith. The ratchet head 136 has peripheral ratchet teeth 138 thereon adjacent the housing wall 42. A ratchet pawl 139 is pivotally mounted on the housing wall 42 so that the locking point 140 on pawl 139 is maintained in operative contact with the ratchet teeth 138 on head 136 by the weight of the pawl when it is in the solid line position as seen in FIG. 7 to prevent clockwise rotation of shaft 30 as seen in FIG. 7 where the shaft 30 is rotated counterclockwise to tighten the flexible tie down member 35. The locking mechanism 135 can be released by manually pivoting the ratchet pawl 139 clockwise as seen in FIG. 7 to disengage the locking point 140 from the ratchet teeth 138. The rotational direction in which shaft 30 is locked by mechanism 135 can be reversed by reversing the teeth 138 on ratchet head 136 and the orientation of pawl 139 as is well understood in the art. Different configurations may be used including configurations which lock shaft 30 against movement in both rotational directions. The operator can easily determine the amount of tie down simply by counting the number of ratchet teeth 138 that have moved past the locking point 140 on ratchet pawl 139 after the slack has been taken out of the flexible tie down member 35.

SECOND MODIFICATION

Figure 9:
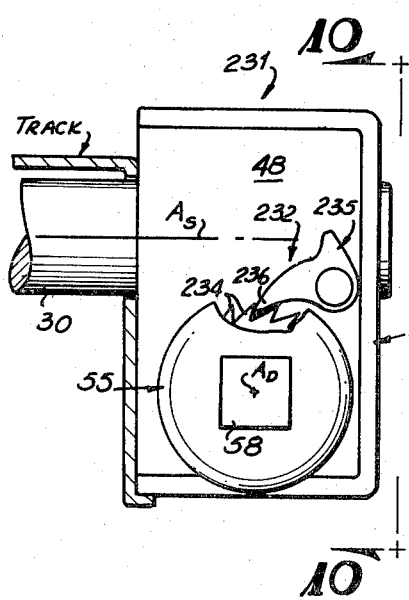
FIG. 9 is a view similar to FIG. 6 showing a second modification of the invention.
Figure 10:
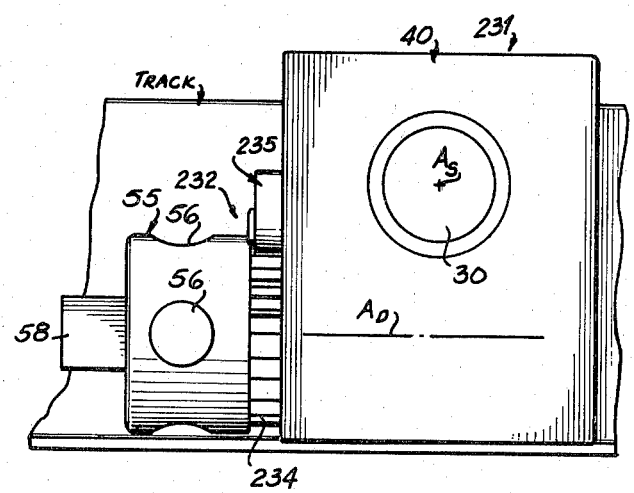
FIG. 10 is a view taken along line 10—10 in FIG. 9.

Referring to FIGS. 9 and 10, a second modification of the shaft driving mechanism is shown and has been generally by the numeral 231 with the components common to the mechanism 31 having like reference numbers applied thereto. The shaft driving mechanism 231 has a locking mechanism 232 associated with the driving member 55. The driving member 55 has peripheral ratchet teeth 234 thereon adjacent the housing wall 48.

A ratchet pawl 235 is pivotally mounted on the housing wall 48 so that the locking point 236 on pawl 235 is maintained in operative contact with the ratchet teeth 234 on driving member 55 by the weight of the pawl when it is the solid line position as seen in FIG. 9 to prevent clockwise rotation of driving member 55 as seen in FIG. 9 where the driving member 55 is rotated counterclockwise to tighten the flexible tie down member 35. The locking mechanism 232 can be released by manually pivoting the ratchet pawl 235 clockwise as seen in FIG. 9 to disengage the locking point 236 from the ratchet teeth 234. The rotational direction in which driving member 55 is locked by mechanism 232 can be reversed by reversing the teeth 234 on driving member 55 and the orientation of pawl 235 as is well understood in the art. Different configurations may be used including configurations which lock driving member 55 against movement in both rotational directions. The operator can easily determine the amount of tie down simply by counting the number of ratchet teeth 234 that have moved past the locking point 236 on ratchet pawl 235 after the slack has been taken out of the flexible tie down member 35.

What is claimed as invention is:

1. A tie down assembly for selectively securing a wheeled vehicle to a track on a vehicle supporting track assembly in vehicle carriers using an attachment point on the vehicle comprising:

a guide assembly operatively connected to the track on the track assembly, said guide assembly including a pair of spaced apart side members fixedly mounted on the track assembly and extending longitudinally of and adjacent said track and a plurality of guide members attached between said side members at spaced apart positions along the length of said side members to define a series of spaced apart openings along the length of said guide assembly and the track; and a tie down mechanism operatively connected to the track assembly in operative association with said guide assembly, said tie down mechanism including a tie down winding shaft rotatably mounted on the vehicle supporting track assembly adjacent the track;

a flexible tie down member having opposed ends, one of said ends connected to said tie down winding shaft so that said tie down member will be wound around said tie down winding shaft as said winding shaft is rotated and the other of said ends adapted to be attached to the attachment point on the vehicle; and a drive mechanism mounted on the vehicle supporting track assembly and operatively connected to said tie down winding shaft to rotate said tie down winding shaft, said drive mechanism including an input drive member adapted to be engaged and rotated, and gearing means interconnecting said tie down winding shaft and said input drive member so that rotation of said input member rotates said tie down winding shaft, said gearing means constructed and arranged so that said input drive member can be rotated to drive said tie down winding shaft while rotation of said tie down winding shaft to drive said input drive member is substantially precluded so that that end of said flexible tie down member adapted to be attached to the vehicle can be passed around a selected one of said guide members through the opening associated therewith and attached to the attachment point on the vehicle to establish the angle of the force exerted on the vehicle by the tie down member, and said input drive member manually rotated to rotate said winding shaft and tighten said flexible tie down member to apply said force on the vehicle directed toward the track whose angle is determined by said guide member selected around which said flexible tie down member extends.

2. The tie down assembly of claim 1 wherein said gearing means includes a worm operatively connected to said input member for rotation by said input member; and a worm gear in mesh with said worm and operatively connected to said tie down winding shaft so that rotation of said worm drivingly rotates said worm gear and said tie down winding shaft, said worm having a lead angle such that said worm gear is prevented from rotating said worm.

3. The tie down assembly of claim 1 wherein said drive mechanism further includes a housing rotatably mounting said tie down winding shaft therein and an input shaft rotatably mounted in said housing about an axis normal to and spaced from said tie down winding shaft, said input shaft fixedly mounting said input drive member thereon externally of said housing; and wherein said gearing means includes a worm gear mounted on said tie down winding shaft within said housing and a worm mounted on said input shaft within said housing and in mesh with said worm gear so that rotation of said input drive member causes said worm to drive said worm gear and rotate said tie down winding shaft.

4. The tie down assembly of claim 1 further including releasable locking means operatively associated with said drive mechanism to selectively prevent rotation of said tie down winding shaft at least in a direction such that said flexible tie down member will be unwound from around said tie down winding shaft to reduce the force tying down the vehicle.

5. The tie down assembly of claim 4 wherein said releasable locking means includes a locking head attached to said tie down winding shaft and rotatable therewith, said locking head defining peripheral locking teeth thereon; and a releasable locking pawl operatively associated with said locking teeth on said locking head to selectively engage said locking teeth so as to selectively prevent rotation of said tie down shaft at least in a direction such that said flexible tie down member will be unwound from around said tie down shaft to reduce the force tying down the vehicles.

6. The tie down assembly of claim 4 wherein said releasable locking means includes peripheral locking teeth defined on said input drive member; and a releasable locking pawl operatively associated with said locking teeth on said input drive member to selectively engage said locking teeth so as to selectively prevent rotation of said tie down shaft at least in a direction such that said flexible tie down member will be unwound from around said tie down shaft to reduce the force tying down the vehicle.

* * * * *